US009647753B1

(12) United States Patent
Kurisu et al.

(10) Patent No.: US 9,647,753 B1
(45) Date of Patent: May 9, 2017

(54) COHERENT OPTICAL RECEIVER

(71) Applicant: Fujitsu Optical Components Limited, Kawasaki-shi, Kanagawa (JP)

(72) Inventors: Masayuki Kurisu, Sapporo (JP); Shuichi Yasuda, Sapporo (JP); Takeyasu Tomioka, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/993,484

(22) Filed: Jan. 12, 2016

(51) Int. Cl.
*H04B 10/06* (2006.01)
*H04B 10/079* (2013.01)
*H04J 14/02* (2006.01)
*H04B 10/61* (2013.01)

(52) U.S. Cl.
CPC ..... *H04B 10/07957* (2013.01); *H04B 10/614* (2013.01); *H04J 14/0221* (2013.01)

(58) Field of Classification Search
CPC .............................. H04B 10/61; H04B 10/616
USPC ................................................. 398/202, 205
See application file for complete search history.

(56) References Cited

U.S. PATENT DOCUMENTS

| 7,936,999 | B1* | 5/2011 | Hawryluck | H04B 10/60 |
| | | | | 398/152 |
| 9,048,956 | B2* | 6/2015 | Suzuki | H04B 10/612 |
| 9,252,888 | B2* | 2/2016 | Morie | H04B 10/611 |
| 2008/0145066 | A1* | 6/2008 | Hoshida | H04B 10/61 |
| | | | | 398/205 |
| 2009/0047030 | A1* | 2/2009 | Hoshida | H04B 10/60 |
| | | | | 398/205 |
| 2009/0317092 | A1* | 12/2009 | Nakashima | H04B 10/61 |
| | | | | 398/204 |
| 2010/0080571 | A1* | 4/2010 | Akiyama | G02F 1/0123 |
| | | | | 398/184 |
| 2010/0178065 | A1* | 7/2010 | Nishihara | H04B 10/61 |
| | | | | 398/202 |
| 2010/0254718 | A1* | 10/2010 | Oda | H04B 10/60 |
| | | | | 398/202 |
| 2010/0260504 | A1* | 10/2010 | Takahara | H04B 10/5053 |
| | | | | 398/152 |

(Continued)

FOREIGN PATENT DOCUMENTS

WO WO 2012/066859 A1 5/2012
WO WO 2015/004828 A1 1/2015

*Primary Examiner* — Ken N Vanderpuye
*Assistant Examiner* — Amritbir Sandhu
(74) *Attorney, Agent, or Firm* — Staas & Halsey LLP

(57) ABSTRACT

A coherent optical receiver includes: an attenuator that adjusts a power of an input optical signal; a mixer that mixes an optical signal output from the attenuator and local oscillator light; a photo detector that converts an optical signal output from the mixer into an electric signal; an amplifier that amplifies an output signal of the photo detector; a gain controller that controls a gain of the amplifier; a memory that stores dependence information that indicates a relation between an input optical power of an optical signal of a specified wavelength and a gain of the amplifier; and a controller that calculates an input optical power of the target wavelength based on a gain of the amplifier and the dependence information, and controls an attenuation amount of the attenuator based on the calculated input optical power, when a WDM optical signal is input into the coherent optical receiver.

5 Claims, 13 Drawing Sheets

(56) References Cited

U.S. PATENT DOCUMENTS

| | | | | |
|---|---|---|---|---|
| 2012/0069854 A1* | 3/2012 | Suzuki | ................ | H04B 10/611 |
| | | | | 370/465 |
| 2012/0076506 A1* | 3/2012 | Goebuchi | ............ | H04B 10/615 |
| | | | | 398/202 |
| 2013/0071109 A1* | 3/2013 | Khatana | ............. | H04B 10/6164 |
| | | | | 398/38 |
| 2013/0236172 A1* | 9/2013 | Suzuki | ................ | H04B 10/612 |
| | | | | 398/43 |
| 2013/0322876 A1 | 12/2013 | Gehrke et al. | | |
| 2013/0336665 A1* | 12/2013 | Suzuki | ................ | H04B 10/611 |
| | | | | 398/208 |
| 2013/0343751 A1* | 12/2013 | Mamyshev | ............ | H04B 10/61 |
| | | | | 398/38 |
| 2015/0249507 A1 | 9/2015 | Suzuki | | |
| 2016/0142152 A1* | 5/2016 | Murakami | ........... | H04B 10/616 |
| | | | | 398/79 |

* cited by examiner

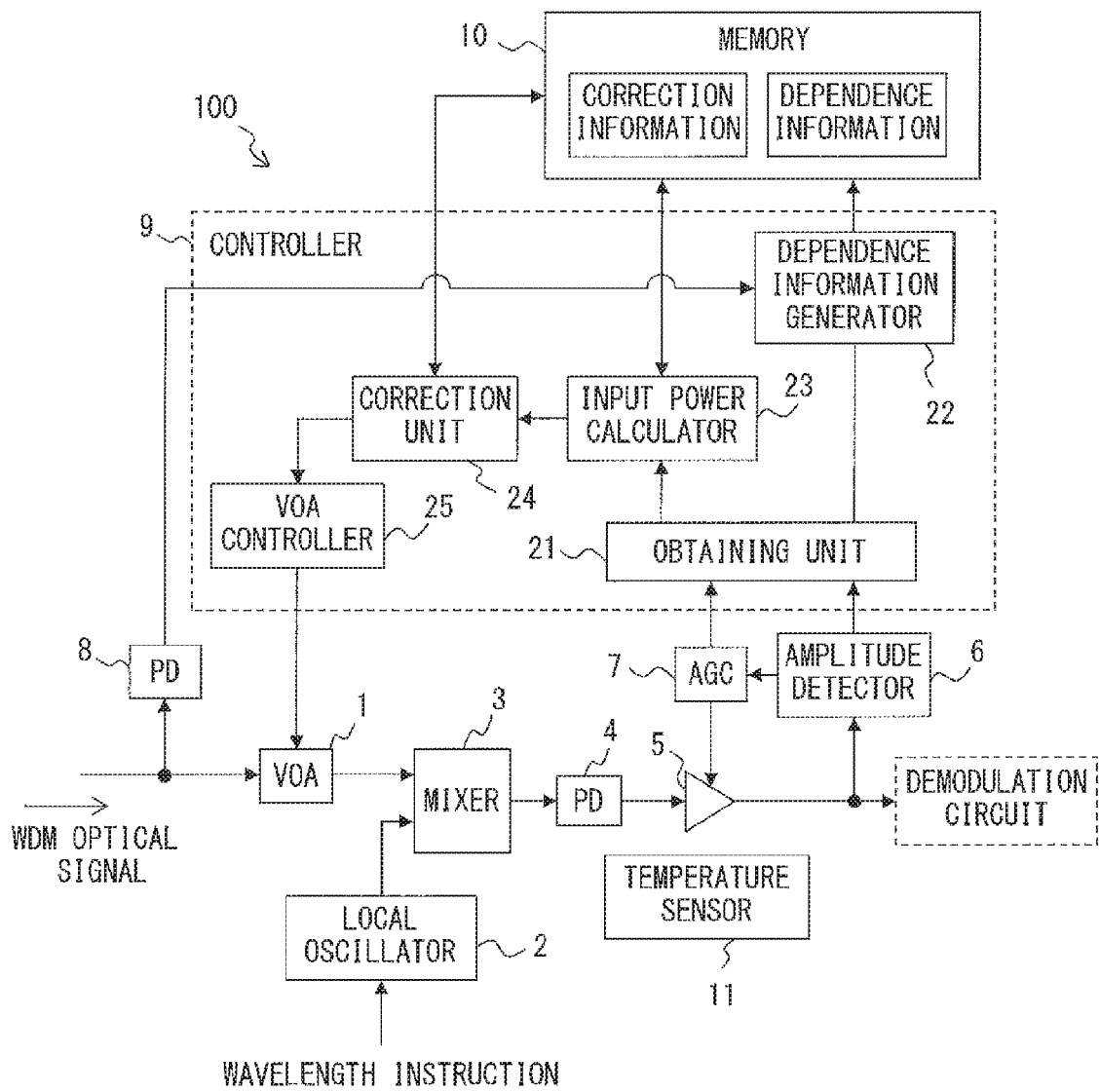
F I G. 1

| GAIN CONTROL VOLTAGE [V] | INPUT OPTICAL POWER [uW] |
|---|---|
| 1.3 | 600 |
| 1.5 | 400 |
| 2 | 150 |
| 2.5 | 60 |

FIG. 3

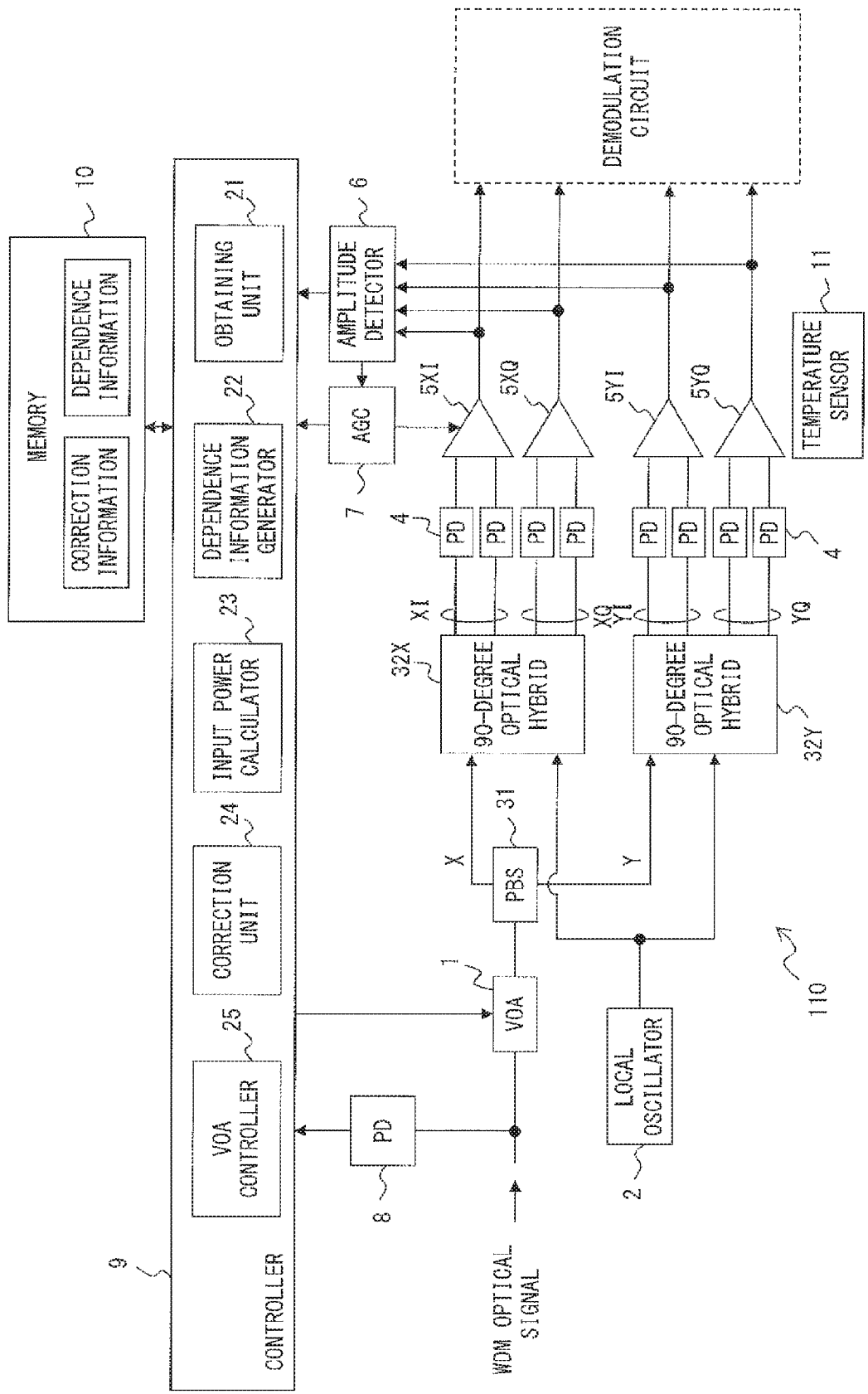
F I G. 8

| GAIN CONTROL VOLTAGE OF XI [V] | INPUT OPTICAL POWER [uW] | XI COMPONENT OF INPUT OPTICAL POWER [uW] |
|---|---|---|
| 1.3 | 1200 | 300 |
| 1.5 | 800 | 200 |
| 2 | 300 | 75 |
| 2.5 | 120 | 30 |

FIG. 9

COHERENT OPTICAL RECEIVER

FIELD

The embodiments discussed herein are related to a coherent optical receiver that receives a wavelength division multiplexed optical signal.

BACKGROUND

A coherent optical receiver includes a local oscillator and mixes a received optical signal and a local oscillator light. A carrier wavelength of the received optical signal and a wavelength of the local oscillator light are approximately the same each other. A mixed light of the received optical signal and the local oscillator light is converted into an electric signal by a photo detector. The electric signal is amplified by an amplifier (for example, a Transimpedance Amplifier (TIA)) and then guided to a signal processing circuit. The signal processing circuit includes a demodulation circuit and so on, and recovers data from a received signal.

In order to improve a sensitivity of the photo detector in the coherent optical receiver, it is requested that an input optical power (or input optical intensity) of the photo detector be appropriately controlled. Thus, the coherent optical receiver is equipped with a variable optical attenuator (VOA) to adjust a power of the received optical signal. In addition, the coherent optical receiver is equipped with a monitor circuit that branches the received optical signal and monitors a power of the branched received optical signal. The variable optical attenuator is controlled based on the monitor result by the monitor circuit such that an optical signal with an appropriate power is guided to the photo detector.

When an optical signal of a specified wavelength (hereinafter referred to as a target wavelength) is selectively received from a wavelength division multiplexed (WDM) optical signal, the coherent optical receiver controls a wavelength of the oscillator light to be the target wavelength. By doing this, an electric signal that indicates an optical signal of the target wavelength is obtained by the photo detector.

Note that International Publication Pamphlet No. WO2012/066859 describes a configuration in which a variable optical attenuator is adjusted based on an output amplitude of an amplifier that amplifies an output signal of a photo detector. International Publication Pamphlet No. WO2015/004828 describes a configuration in which a variable optical attenuator is adjusted based on a gain control signal of an amplifier that amplifies an output signal of a photo detector. In addition, US Patent Publication No. 2013/0343751 and US Patent Publication No. 2013/0322876 describe related technologies.

When an optical signal of a target wavelength is selectively received from a WDM optical signal using a coherent optical receiver according to conventional technologies, it is difficult to precisely measure an input optical power of the target wavelength. For example, if a power of an input WDM optical signal is measured and the measured value is divided by a number of wavelength channels multiplexed in the WDM optical signal, an input optical power of one wavelength channel may be calculated. However, optical powers of respective wavelength channels multiplexed in the WDM optical signal are not equal to each other. Thus, the input optical power calculated using this method will include an error.

Note that if an optical filter that extracts an optical signal of a target wavelength is provided on the input side of the coherent optical receiver, an input power of the target wavelength may be precisely calculated. However, the configuration in which the optical filter is provided on the input side of the coherent optical receiver is not preferable for reducing a cost of communication equipment.

SUMMARY

According to an aspect of the embodiments, a coherent optical receiver includes: a variable optical attenuator that adjusts a power of an input optical signal; a local oscillator that generates local oscillator light of a target wavelength; a mixer that mixes an optical signal output from the variable optical attenuator and the local oscillator light; a photo detector that converts an optical signal output from the mixer into an electric signal; an amplifier that amplifies an output signal of the photo detector; a gain controller that controls a gain of the amplifier; a detector that detects an amplitude of an output signal of the amplifier; a memory that stores dependence information that indicates a relation between an input optical power of an optical signal of a specified wavelength and a gain of the amplifier, the dependence information being obtained when an optical signal of the specified wavelength is input into the coherent optical receiver and an amplitude of the output signal of the amplifier is controlled to be a specified target amplitude; and a controller that calculates an input optical power of the target wavelength based on an amplitude of the output signal of the amplifier, a gain of the amplifier, and the dependence information, and controls an attenuation amount of the variable optical attenuator based on the calculated input optical power, when a wavelength division multiplexed optical signal is input into the coherent optical receiver.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a coherent optical receiver according to an embodiment of the invention.

FIG. 3 illustrates an example of the dependence information.

FIG. 8 illustrates an example of a coherent optical receiver according to a first embodiment.

FIG. 9 illustrates an example of the dependence information for an XI component.

DESCRIPTION OF EMBODIMENTS

Figure 2:
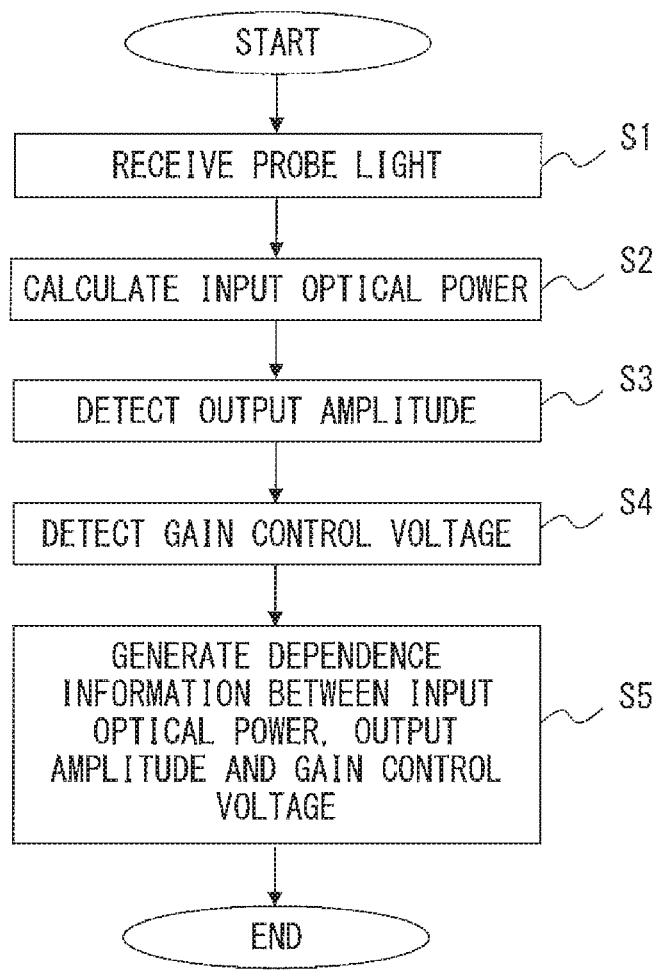
FIG. 2 is a flowchart that illustrates an example of a process to generate dependence information.

FIG. 1 illustrates an example of a coherent optical receiver according to an embodiment of the invention. A coherent optical receiver 100 illustrated in FIG. 1 can selectively receive an optical signal of a desired wavelength from a plurality of optical signals multiplexed in a WDM optical signal. The coherent optical receiver 100 includes a variable optical attenuator (VOA) 1, a local oscillator 2, a mixer 3, a photo detector (PD) 4, an amplifier 5, an amplitude detector 6, a gain controller (AGC) 7, a photo detector (PD) 8, a controller 9, a memory 10, and a temperature sensor 11. Note that the coherent optical receiver 100 may include other circuit elements that are not illustrated in FIG. 1.

The variable optical attenuator 1 attenuates an input optical signal according to an instruction given from the controller 9. That is, an attenuation amount of the variable optical attenuator 1 is instructed from the controller 9. The oscillator 2 generates a local oscillator light of a target wavelength indicated by a wavelength instruction. The wavelength instruction is given from, for example, a user or a network administrator. The wavelength instruction may be given from an application in the upper layer. The mixer 3 mixes an input optical signal and the local oscillator light. The photo detector 4 converts an output light of the mixer 3 into an electric signal. Note that there is an upper limit in optical frequency that the photo detector 4 can detect. For example, when a bandwidth of the photo detector 4 is 20 GHz, the photo detector 4 cannot detect light of a frequency higher than 20 GHz.

When the coherent optical receiver 100 receives a WDM optical signal, mixed light of the WDM optical signal and the local oscillator light is input into the photo detector 4. It is assumed that optical signals 1-$n$ are multiplexed in the WDM optical signal and wavelengths of the optical signals 1-$n$ are $\lambda 1$-$\lambda n$, respectively. In addition, it is assumed that a wavelength of the local oscillator light (that is, a target wavelength) is $\lambda x$. In this case, when the WDM optical light and the local oscillator light are mixed in the mixer 3, an optical signal of the wavelength $\lambda x$ (hereinafter referred to as an optical signal x) is converted into baseband. Thus, the optical signal x is detected by the photo detector 4. However, carrier frequencies of the other optical signals output from the mixer 3 are too high to be detected by the photo detector 4. For example, when a frequency spacing of a WDM system is 50 GHz, the carrier frequencies of the other optical signals output from the mixer 3 are integral multiples of 50 GHz. Thus, the photo detector 4 substantially converts only an optical signal of a wavelength that is the same as the target wavelength into an electric signal. That is to say, a signal in a specified wavelength channel (hereinafter referred to as a target channel signal) is extracted from an input WDM optical signal.

The amplifier 5 amplifies an output signal of the photo detector 4. That is, the amplifier 5 amplifies the target channel signal. Note that the amplifier 5 may be implemented by a Transimpedance Amplifier (TIA). In this case, a current signal output from the photo detector 4 is converted by the amplifier 5 into a voltage signal. The target channel signal amplified by the amplifier 5 is guided to a demodulation circuit that is not illustrated in FIG. 1.

The amplitude detector 6 detects an amplitude of the output signal of the amplifier 5. That is, the amplitude detector 6 detects an amplitude of the target channel signal. The gain controller 7 controls a gain of the amplifier 5. In this example, the gain controller 7 controls a gain of the amplifier 5 in AGC (Auto Gain Control) mode. For example, the gain controller 7 controls a gain of the amplifier 5 such that the amplitude of the output signal of the amplifier 5 is maintained at a target amplitude. The target amplitude of the output signal of the amplifier 5 may be determined in advance according to a configuration of the demodulation circuit. Note that, in the following descriptions, the amplitude of the output signal of the amplifier 5 may be referred to as an "output amplitude".

The photo detector 8 detects a power of input light. Note that the photo detector 8 is used when dependence information described below is generated.

The controller 9 calculates an input optical power of a target wavelength based on a gain of the amplifier 5, an output amplitude of the amplifier 5 and the dependence information described below when a WDM optical signal is input into the coherent optical receiver 100. The controller 9 includes an obtaining unit 21, a dependence information generator 22, an input power calculator 23, a correction unit 24, and a VOA controller 25. Note that the controller 9 is implemented by, for example, a processor system that includes a processor element and a memory. In this case, the controller 9 can provide functions of the obtaining unit 21, the dependence information generator 22, the input power calculator 23, the correction unit 24 and the VOA controller 25 by executing a given program. However, part of the functions of the controller 9 may be implemented by a hardware circuit.

The obtaining unit 21 obtains output amplitude information that indicates an output amplitude of the amplifier 5 from the amplitude detector 6. In addition, the obtaining unit 21 obtains gain information that indicates a gain of the amplifier 5 from the gain controller 7. The gain information may indicate a gain control voltage for controlling a gain of the amplifier 5.

The dependence information generator 22 generates dependence information that indicates a relationship between an input optical power, an output amplitude of the amplifier 5, and a gain of the amplifier 5 when an optical signal of a specified wavelength is input into the coherent optical receiver 100. For example, the dependence information generator 22 generates dependence information that indicates a relationship between an input optical power and a gain of the amplifier 5 to realize a state in which an output amplitude of the amplifier 5 matches a target amplitude when an optical signal of a certain wavelength is input into the coherent optical receiver 100. The input optical power is detected by the photo detector 8 during a procedure of generating the dependence information. The dependence information is stored in the memory 10. In addition, the dependence information generator 22 generates correction information for correcting an input power value that is calculated by the input power calculator 23 based on a temperature of the amplifier 5 and/or a target wavelength. The correction information is also stored in the memory 10.

The input power calculator 23 calculates an input optical power of a target wavelength based on an output amplitude of the amplifier 5, a gain of the amplifier 5, and the dependence information stored in the memory 10 when a WDM optical signal is input into the coherent optical receiver 100. The correction unit 24 corrects an input optical power value calculated by the input power calculator 23 based on a temperature of the amplifier 5 and/or a target wavelength. At this time, the correction unit 24 corrects the input optical power value by using the correction information stored in the memory 10. The VOA controller 25 adjusts an attenuation amount of the variable optical attenuator 1 according to the input optical power value corrected by the correction unit 24. That is, the VOA controller 25 adjusts a power of the input WDM optical signal according to the input optical power value corrected by the correction unit 24. Note that when the controller 9 does not include the correction unit 24, the VOA controller 25 adjusts a power of the input WDM optical signal according to the input optical power value calculated by the input power calculator 23.

The memory 10 stores the dependence information and the correction information. The memory 10 is realized by, for example, a semiconductor memory. The temperature sensor 11 is arranged near the amplifier 5 and measures temperature around the amplifier 5.

FIG. 2 is a flowchart that illustrates an example of a process to generate dependence information. The process to generate the dependence information may be executed before the coherent optical receiver 100 receives a WDM optical signal. Note that when the process to generate the dependence information is executed, an attenuation amount of the variable optical attenuator 1 is adjusted to be a specified initial value (for example, zero) in advance.

In S1, the coherent optical receiver 100 receives probe light of a specified wavelength. It is preferable that a wavelength of the probe light be the same as a wavelength of one of the wavelength channels of a WDM optical signal. The probe light is guided to the variable optical attenuator 1. In addition, the probe light is branched by an optical splitter that is not illustrated in FIG. 1 and guided to the photo detector 8. The photo detector 8 converts the probe light into an electric signal.

Note that when the process to generate the dependence information is executed, a wavelength of output light of the local oscillator 2 is controlled to be the same as the wavelength of the probe light. Thus, the photo detector 4 detects the probe light. That is, the photo detector 4 outputs an electric signal that indicates the probe light. The amplifier 5 amplifies the output signal of the photo detector 4.

In S2, the dependence information generator 22 calculates an input optical power of the probe light based on an output signal of the photo detector 8. In S3, the amplitude detector 6 detects an output amplitude of the amplifier 5. The output amplitude of the amplifier 5 is controlled to be a target amplitude in AGC mode by the gain controller 7. Thus, the output amplitude detected by the amplitude detector 6 is expected to be the same or approximately the same as the target amplitude. The obtaining unit 21 obtains output amplitude information that indicates the output amplitude of the amplifier 5 from the amplitude detector 6. In S4, the gain controller 7 detects a gain control voltage of the amplifier 5. At this time, the gain controller 7 controls a gain of the amplifier 5 in AGC mode such that the output amplitude of the amplifier 5 approaches the target amplitude. Then the obtaining unit 21 obtains gain information that indicates the gain control voltage for controlling a gain of the amplifier 5 from the gain controller 7. The obtaining unit 21 gives the output amplitude information obtained in S3 and the gain information obtained in S4 to the dependence information generator 22.

In S5, the dependence information generator 22 generates the dependence information that indicates a relationship between the input optical power of the probe light, the output amplitude of the amplifier 5, and the gain control voltage of the amplifier 5. For example, the dependence information generator 22 generates the dependence information that indicates a relationship between the input optical power and a gain of the amplifier 5 to realize a state in which an output amplitude of the amplifier 5 matches a specified target amplitude when the probe light is input into the coherent optical receiver 100. Then the dependence information generator 22 stores the generated dependence information in the memory 10. Note that when the input optical power of the probe light is known, S2 may be omitted. In this case, the coherent optical receiver 100 does not need to include the photo detector 8.

The processes in the flowchart illustrated in FIG. 2 are executed while the input power of the probe light is being changed. That is, the processes in the flowchart are respectively executed for a plurality of different input optical powers. Then the dependence information generator 22 collects the output amplitude information and the gain information with respect to each of the different input optical powers and stores the collected information in the memory 10.

FIG. 3 illustrates an example of the dependence information stored in the memory. In the example illustrated in FIG. 3, the output amplitude of the amplifier 5 is controlled to be 1 Vpp. The temperature around the amplifier 5 is 25 degrees. Under these conditions, the gain control voltages of the amplifier 5 are respectively detected when the input optical powers of the probe light are 600 μW, 400 μW, 150 μW, and 60 μW. For example, when the input optical power of the probe light is 600 μW, the output amplitude of the amplifier 5 is maintained at 1 Vpp if the gain control voltage of the amplifier 5 is controlled to be 1.3V. When the input optical power of the probe light is 60 μW the output amplitude of the amplifier 5 is maintained at 1 Vpp if the gain control voltage of the amplifier 5 is controlled to be 2.5V.

Figure 4:
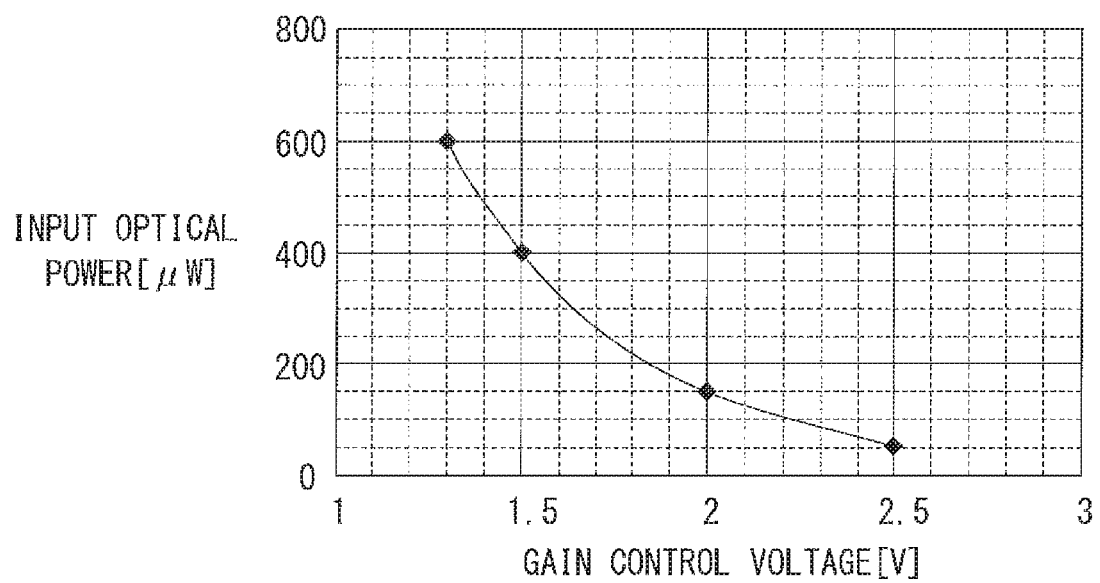
FIG. 4 illustrates an example of a method to generate a dependence formula.

FIG. 4 illustrates an example of a method to generate a dependence formula. A graph illustrated in FIG. 4 indicates the dependence information illustrated in FIG. 3. A horizontal axis represents a gain control voltage of the amplifier 5, and a vertical axis represents an input optical power of the probe light. Note that the output amplitude of the amplifier 5 is maintained in AGC mode at 1 Vpp.

The dependence information generator 22 may generate a dependence formula that indicates a relationship between the input optical power of the probe light and the gain control voltage of the amplifier 5 based on the graph illustrated in FIG. 4. The dependence formula may be obtained by calculating a fitting curve or an approximate curve corresponding to sampled points (four sampled points in the example in FIG. 3 and FIG. 4). In the example in FIG. 3 and FIG. 4, the dependence formula is represented by the formula (1) below.

$$P = -345.24\ v^3 + 2371.43\ v^2 - 5606.55\ v + 4639.29 \tag{1}$$

P represents an input optical power. v represents a gain control voltage of the amplifier 5. Note that the dependence formula is an example of the dependence information.

The dependence between an input optical power, an output amplitude and a gain control voltage changes with respect to a wavelength of an input optical signal and a temperature of the amplifier 5. Thus, the dependence information generator 22 may generate wavelength correction information that compensates for a wavelength dependence and temperature correction information that compensates for a temperature dependence.

Figure 5A:
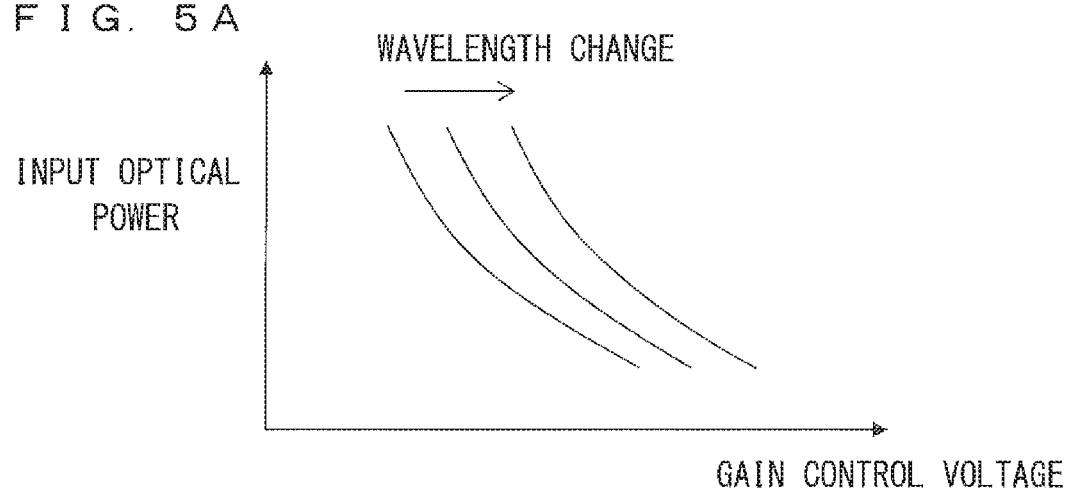
FIG. 5A illustrates wavelength dependence of the dependence information.

In order to generate the wavelength correction information, the processes in the flowchart illustrated in FIG. 2 are executed while a wavelength of the probe light is being changed. That is, the processes in the flowchart are respectively executed for a plurality of different wavelengths. As a result, as illustrated in FIG. 5A, dependence curves are respectively obtained for different wavelengths. Then the dependence information generator 22 generates the wavelength correction information based on the dependence curves. The wavelength correction information is represented by, for example, ΔP1 [μW/nm]. In this case, the wavelength correction information indicates that "when a wavelength of an input optical signal is shifted by 1 nm with respect to a reference wavelength, an input optical power is to be corrected by ΔP1μw". Note that the reference wavelength is a center wavelength of a WDM optical signal, for example.

Figure 5B:
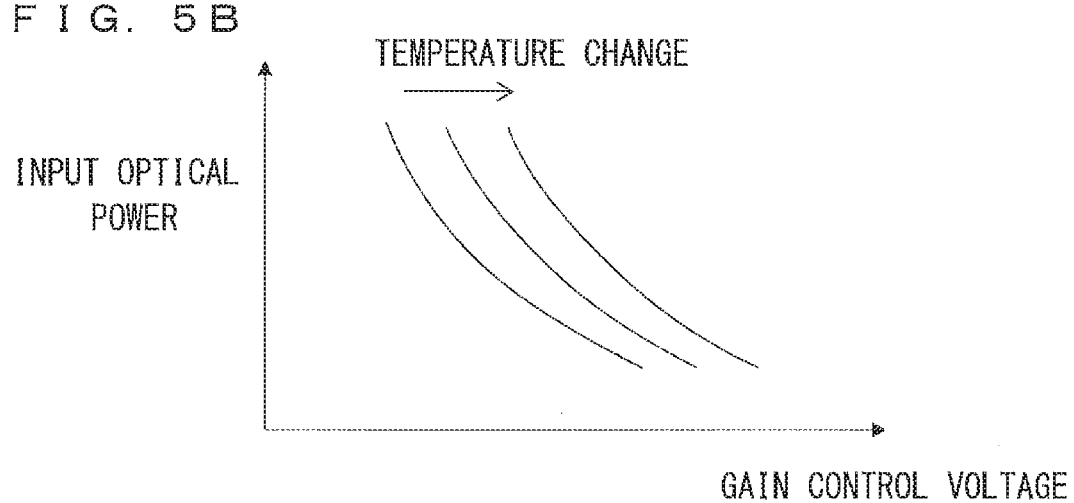
FIG. 5B illustrates temperature dependence of the dependence information.

In order to generate the temperature correction information, the processes in the flowchart illustrated in FIG. 2 are executed while temperature around the amplifier 5 is being changed. That is, the processes in the flowchart are respectively executed for a plurality of different temperatures. As a result, as illustrated in FIG. 5B, dependence curves are respectively obtained for different temperatures. Then the dependence information generator 22 generates the temperature correction information based on the dependence curves. The wavelength correction information is represented by, for example, ΔP2 [μW/degree]. In this case, the temperature correction information indicates that "when temperature around the amplifier 5 rises one degree with respect to a reference temperature, an input optical power is to be corrected by ΔP2 μW". Note that the reference temperature is a previously specified temperature (for example, 25 degrees).

As described, the dependence information generator 22 generates the dependence information that indicates a relationship between an input optical power, an output amplitude of the amplifier 5, and a gain of the amplifier 5, and stores the dependence information in the memory 10. In addition, the dependence information generator 22 generates the correction information (wavelength correction information and temperature correction information), and stores the correction information in the memory 10.

Next, a method for measuring an input optical power of an optical signal of a target wavelength extracted from a WDM optical signal will be described. Note that it is assumed that the dependence information and the correction information have been stored in the memory 10.

Figure 6:
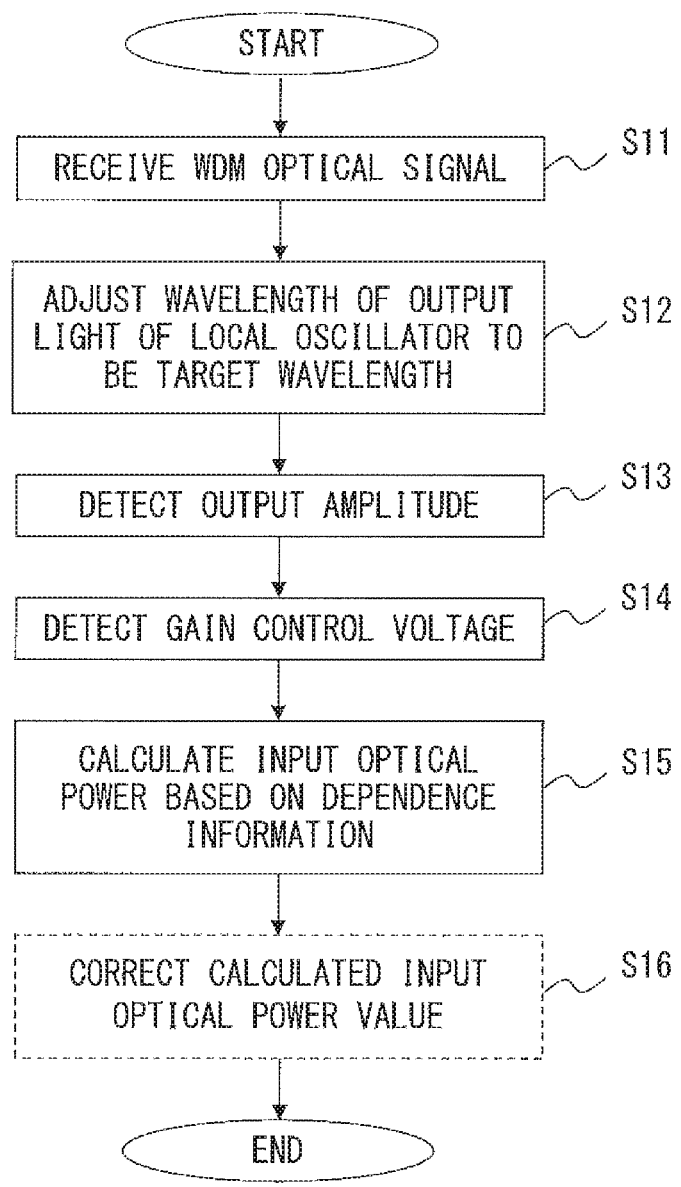
FIG. 6 is a flowchart that illustrates an example of a method to measure an input optical power of a target wavelength.

FIG. 6 is a flowchart that illustrates an example of a method to measure an input optical power of a target wavelength. Note that information that indicates a target wavelength is given to the coherent optical receiver 100. Then the coherent optical receiver 100 receives a WDM optical signal in S11.

In S12, a wavelength instruction that indicates a target wavelength is given to the local oscillator 2. By doing this, the local oscillator 2 oscillates at the target wavelength. That is, the local oscillator 2 generates local oscillator light of the target wavelength. In this case, as described above, the photo detector 4 detects mixed light of the local oscillator light and light of the target wavelength, but does not detect light of the other wavelengths. Thus, the photo detector 4 outputs an electric signal that indicates an optical signal of the target wavelength. The amplifier 5 amplifies the output signal of the photo detector 4.

In S13, the amplitude detector 6 detects an output amplitude of the amplifier 5. Here, the output amplitude of the amplifier 5 is controlled to be a target amplitude. Thus, it is expected that the output amplitude detected by the amplitude detector 6 is the same or approximately the same as the target amplitude. Then the obtaining unit 21 obtains output amplitude information that indicates the output amplitude of the amplifier 5 from the amplitude detector 6 and gives the output amplitude information to the input power calculator 23.

In S14, the gain controller 7 detects a gain control voltage of the amplifier 5. Note that the gain controller 7 controls a gain of the amplifier 5 in AGC mode such that an amplitude of the output signal of the amplifier 5 is maintained at the target amplitude. Then the obtaining unit 21 obtains gain information that indicates the gain control voltage to control the gain of the amplifier 5 from the gain controller 7 and gives the gain information to the input power calculator 23.

In S15, the input power calculator 23 calculates an input optical power of the target wavelength based on the output amplitude information obtained in S13, the gain information obtained in S14, and the dependence information stored in the memory 10. At this time, the input power calculator 23 decides whether the output amplitude of the amplifier 5 is maintained at the target amplitude. When the output amplitude of the amplifier 5 is maintained at the target amplitude, the input power calculator 23 calculates the input optical power of the target wavelength by giving the gain control voltage value indicated by the gain information to the formula (1) above.

In S16, the correction unit 24 corrects the input optical power value calculated by the input power calculator 23 by using the wavelength correction information ΔP1 and the temperature correction information ΔP2. For example, when the target wavelength is shifted by K [nm] with respect to a reference wavelength, the correction unit 24 corrects the input optical power value calculated by the input power calculator 23 by "K×ΔP1". When the temperature around the amplifier 5 is shifted by M degrees with respect to a reference temperature, the correction unit 24 corrects the input optical power value calculated by the input power calculator 23 by "M×ΔP2".

Note that the correction in S16 is not necessarily executed in the method to measure an input optical power of a target wavelength. In addition, only one of the correction according to a wavelength or the correction according to temperature may be executed in S16.

As described, the coherent optical receiver 100 can detect an input optical power of a target wavelength in a WDM optical signal without using an optical filter to extract an optical signal of the target wavelength from the WDM optical signal. In addition, the input optical power of the target wavelength can be detected based on an electric signal corresponding to the target wavelength generated in the coherent detection. Furthermore, the calculated input optical power value is corrected based on the target wavelength and/or the temperature around the amplifier 5. Accordingly, the input optical power of the target wavelength can be detected more precisely than a method in which the input optical power is estimated by dividing a total input optical power of a WDM optical signal by a number of wavelength channels.

Figure 7:
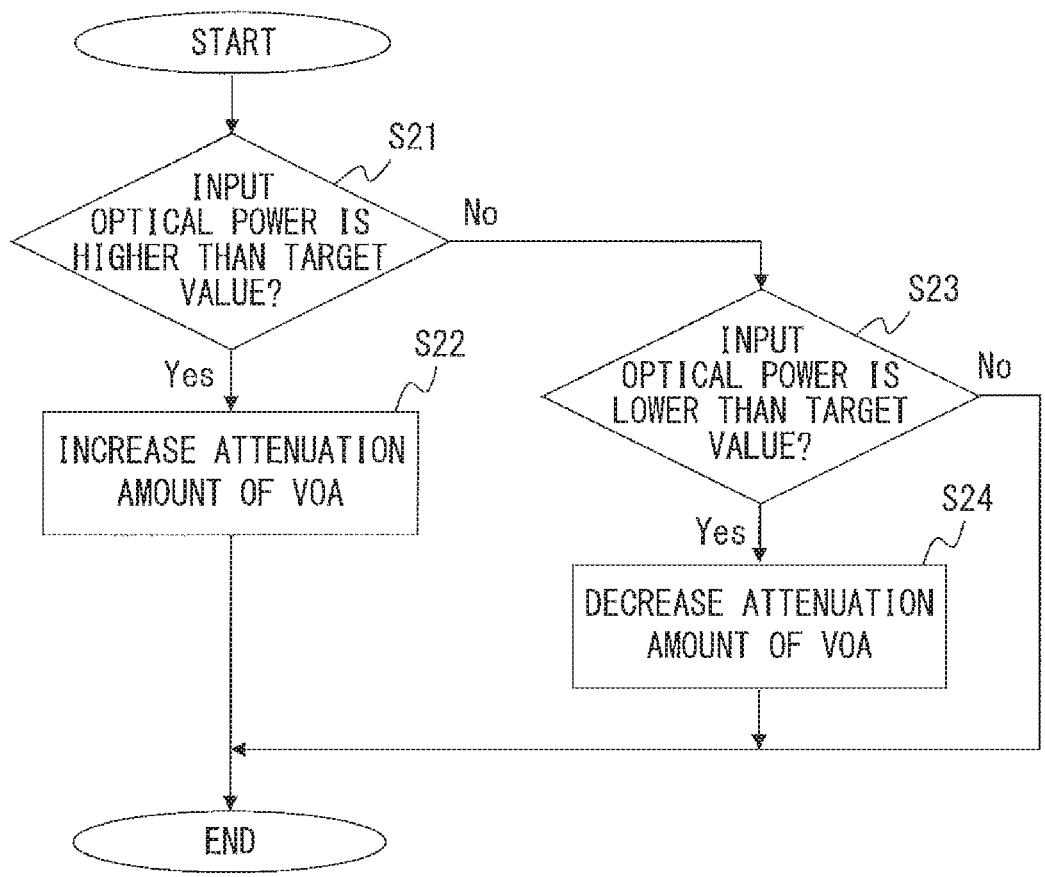
FIG. 7 is a flowchart that illustrates an example of a method to control a variable optical attenuator based on the calculated input optical power.

FIG. 7 is a flowchart that illustrates an example of a method to control a variable optical attenuator 1 based on the calculated input optical power. It is assumed that an input optical power of a target wavelength is calculated by a method illustrated in FIG. 6. In addition, it is assumed that a process illustrated in FIG. 7 is repeatedly executed in specified intervals.

In S21, the VOA controller 25 decides whether an input optical power value calculated by the input power calculator 23 (or an input optical power value corrected by the correction unit 24) is higher than an input optical power target value. The input optical power target value may be determined such that a sensitivity of the photo detector 4 is the highest or approximately the highest. When the input optical power value is higher than the input optical power target value, the VOA controller 25 increases an attenuation amount of the variable optical attenuator 1 by a specified amount in S22. By doing this, a power of output light of the variable optical attenuator 1 decreases. In S23, the VOA controller 25 decides whether the input optical power value is lower than the input optical power target value. When the input optical power value is lower than the input optical power target value, the VOA controller 25 decreases the attenuation amount of the variable optical attenuator 1 by the specified amount in S24. By doing this, the power of the output light of the variable optical attenuator 1 increases. Note that when the input optical power value is substantially the same as the input optical power target value, the VOA controller 25 maintains the attenuation amount of the variable optical attenuator 1.

The input optical power of the target wavelength is substantially maintained at the input optical power target value by repeatedly executing S21-S24 in specified intervals. Here, the variable optical attenuator 1 is controlled based on a precisely calculated input optical power value. Thus, the input optical power of the target wavelength can be precisely maintained at the input optical power target value. As a result, an optical signal of the target wavelength is converted by the photo detector 4 into a high-sensitivity electric signal, and transmission data is recovered with lower error by a demodulation circuit.

According to the embodiments of the invention, an input optical power of a target wavelength can be precisely controlled in a coherent optical receiver that extracts an optical signal of the target wavelength from a received WDM signal.

First Embodiment

FIG. 8 illustrates an example of a coherent optical receiver according to the first embodiment of the invention. Note that the variable optical attenuator (VOA) 1, the local oscillator 2, the photo detector (PD) 8, the controller 9, the memory 10, and the temperature sensor 11 may be substantially the same in FIG. 1 and FIG. 8.

A coherent optical receiver 110 according to the first embodiment can receive a polarization-multiplexed optical signal. Thus, in the following description, it is assumed that a plurality of polarization-multiplexed optical signals are multiplexed in a WDM optical signal that is received by the coherent optical receiver 110. In this case, wavelengths of the plurality of polarization-multiplexed optical signals are different from each other.

A polarization beam splitter (PBS) 31 splits an input optical signal into polarization components (X polarization component and Y polarization component) that are orthogonal to each other. X polarization component and Y polarization component output from the polarization beam splitter 31 are respectively guided to 90-degree optical hybrid circuits 32X and 32Y. The 90-degree optical hybrid circuit 32X mixes X polarization component of the input optical signal and the local oscillator light to generate an XI component and an XQ component. The XI component indicates an I component of X polarization of the input optical signal, and the XQ component indicates a Q component of X polarization of the input optical signal. Similarly, the 90-degree optical hybrid circuits 32Y mixes a Y polarization component of the input optical signal and the local oscillator light to generate a YI component and a YQ component. The YI component indicates an I component of Y polarization of the input optical signal, and the YQ component indicates a Q component of Y polarization of the input optical signal. In this example, each of the XI component, XQ component, YI component and YQ component is transmitted by a differential signal.

The XI component, XQ component, YI component and YQ component are respectively converted into electric signals by corresponding photo detectors 4. Amplifiers 5XI, 5XQ, 5YI and 5YQ respectively amplify corresponding output signals of the photo detectors 4. That is, the amplifier 5XI amplifies an electric signal that indicates the XI component of the input optical signal, the amplifier 5XQ amplifies an electric signal that indicates the XQ component of the input optical signal, the amplifier 5YI amplifies an electric signal that indicates the YI component of the input optical signal, and the amplifier 5YQ amplifies an electric signal that indicates the YQ component of the input optical signal. The demodulation circuit demodulates the output signals of the amplifiers 5XI, 5XQ, 5YI and 5YQ to recover received data.

The amplitude detector 6 detects each output amplitude of the amplifiers 5XI, 5XQ, 5YI and 5YQ. The gain controller 7 controls gains of the amplifiers 5XI, 5XQ, 5YI and 5YQ in AGC mode. For example, the gain controller 7 controls gains of the amplifiers 5XI, 5XQ, 5YI and 5YQ such that the output amplitudes of the amplifiers 5XI, 5XQ, 5YI and 5YQ respectively approach the target amplitude.

The controller 9 generates the dependence information and the correction information by executing processes in the flowchart illustrated in FIG. 2. However, in the coherent optical receiver 110 according to the first embodiment, the controller 9 generates the dependence information respectively for the XI component, XQ component, YI component and YQ component. The correction information may be generated respectively for the XI component, XQ component, YI component and YQ component, or generated for the input optical signal.

In addition, the controller 9 generates the dependence information and calculates the input optical power under the following conditions.

(1) The powers of the X-polarization component and Y-polarization component output from the polarization beam splitter 31 are substantially the same each other (2) The power of the XI component and XQ component output from the 90-degree optical hybrid circuit 32X are substantially the same each other (3) The power of the YI component and YQ component output from the 90-degree optical hybrid circuit 32Y are substantially the same each other Thus, the powers of the XI component, XQ component, YI component and YQ component are substantially the same each other. In this example, each power of the XI component, XQ component, YI component and YQ component is approximately one fourth of an input optical power.

When the dependence information for the XI component is generated, the probe light is input into the coherent optical receiver 110. At this time, the local oscillator 2 is controlled such that a wavelength of the local oscillator light matches a wavelength of the probe light. The controller 9 calculates an input optical power of the probe light based on the output signal of the photo detector 8. The controller 9 obtains an output amplitude of the amplifier 5XI detected by the amplitude detector 6. The controller 9 also obtains a gain control voltage of the amplifier 5XI from the gain controller 7. Then if the output amplitude of the amplifier 5XI is controlled to be a target amplitude, the controller 9 associates the input optical power with the gain control voltage of the amplifier 5XI.

Note that, as described above, an optical power of the XI component is one fourth of an input optical power of an input optical signal (in this example, the probe light). Thus the controller 9 associates "one fourth of the input optical power of the probe light" with the "gain control voltage of the amplifier 5XI" and stores the associated information in the memory 10.

FIG. 9 illustrates an example of the dependence information for the XI component. In this example, the output amplitude of the amplifier 5XI is controlled to be a target amplitude (for example, 1 Vpp). In addition, the gain control voltage of the amplifier 5XI has been detected when the input optical powers of the probe light are 1200 µW, 800 µW, 300 µW and 120 µW respectively. For example, when the input optical power of the probe light is 1200µW the output amplitude of the amplifier 5XI is maintained at 1 Vpp if the gain control voltage of the amplifier 5XI is controlled to be 1.3V. Here, when the input optical power of the probe light is 1200 µW an optical power of the XI component is 300 µW. Therefore, "XI component of the input optical power=300 µW" is associated with "gain control voltage=1.3V".

The dependence information for the XI component is generated by detecting the gain control voltage of the amplifier 5 respectively for different input optical powers while the output amplitude of the amplifier 5 is being maintained at the target amplitude. In addition, the dependence formula for the XI component is obtained by making a graph that indicates a relation between "gain control voltage of the amplifier 5" and "XI component of the input optical power" and calculating a suitable or approximate curve of the graph.

Similarly, the controller 9 generates the dependence information for the XQ component, YI component and YQ component.

Here, the dependence information for the XI component, XQ component, YI component and YQ component are considered to be close each other. However, characteristics of the amplifiers 5XI, 5XQ, 5YI and 5YQ may not be the same as each other. In addition, characteristics of the photo detectors 4 that convert the XI component, XQ component, YI component and YQ component into electric signals may not be the same each other. Thus, it is preferable to prepare the dependence information respectively for the XI component, XQ component, YI component and YQ component.

Figure 10:
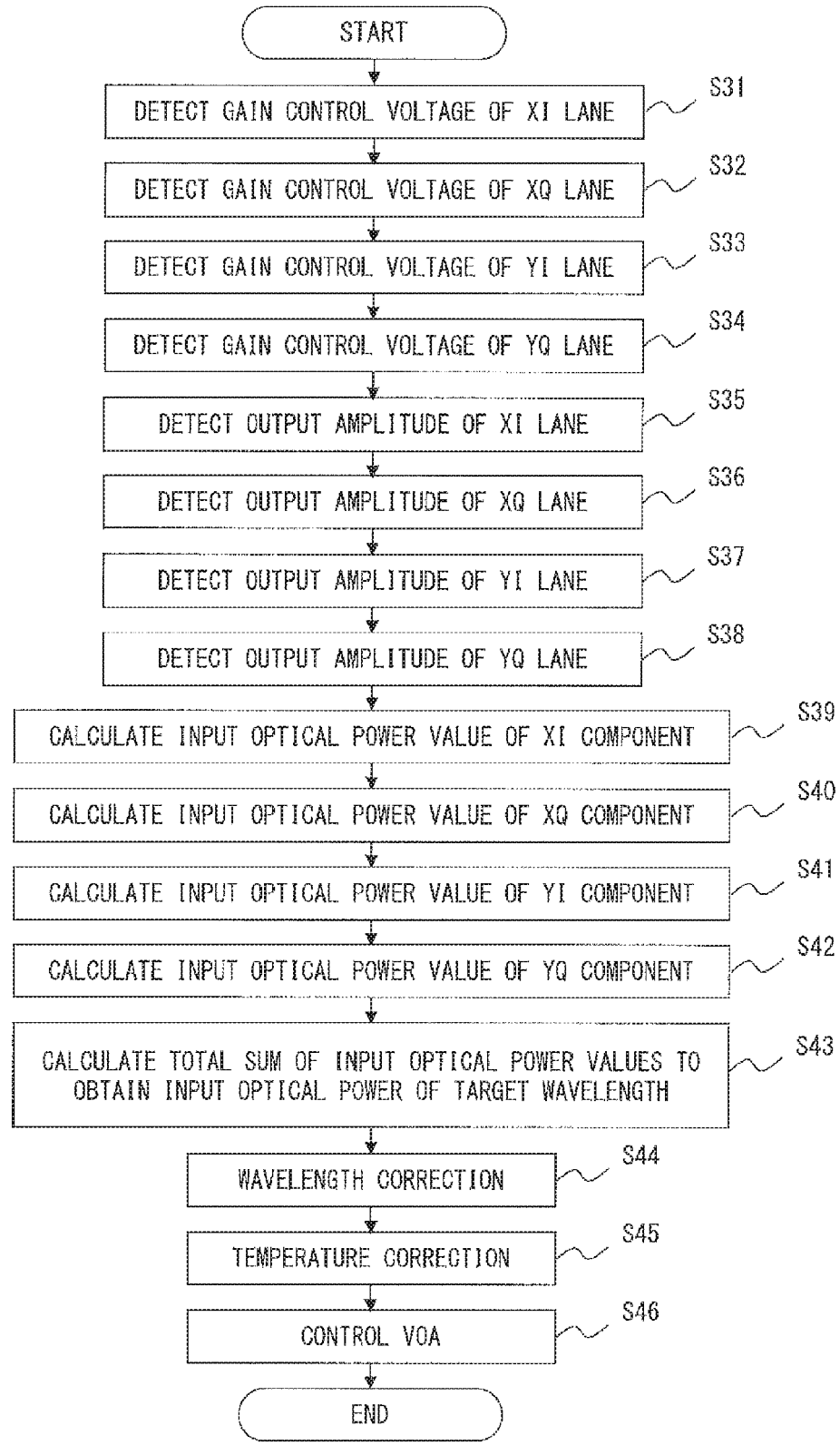
FIG. 10 is a flowchart that illustrates an example of a method to calculate an input optical power of the target wavelength in the first embodiment.

FIG. 10 is a flowchart that illustrates an example of a method to calculate an input optical power of the target wavelength in the first embodiment. It is assumed that the dependence information and the correction information have been stored in the memory 10. The coherent optical receiver 110 receives a WDM optical signal including an optical signal of a target wavelength. The local oscillator 2 outputs the local oscillator light of the target wavelength. Thus, the amplifiers 5XI, 5XQ, 5YI and 5YQ respectively amplify the XI component, XQ component, YI component and YQ component of the optical signal of the target wavelength. In addition, the gain controller 7 controls gains of the amplifiers 5XI, 5XQ, 5YI and 5YQ in AGC mode such that the output amplitudes of the amplifiers 5XI, 5XQ, 5YI and 5YQ respectively approach the target amplitude.

In the following description, an XI lane corresponds to a route through which an electric signal that indicates the XI component of the input optical signal propagates. For example, "gain control voltage of XI lane" indicates a gain control voltage of the amplifier 5XI. "Output amplitude of XI lane" indicates an output amplitude of the amplifier 5XI. Similarly, an XQ lane, a YI lane and a YQ lane respectively indicate routes through which electric signals that indicate the XQ component, the YI component and the YQ component of the input optical signal propagate.

In S31, the controller 9 detects a gain control voltage of the XI lane. That is, the gain control voltage of the amplifier 5XI is detected. Similarly, in S32-S34, the controller 9 detects gain control voltages of the XQ lane, the YI lane and the YQ lane.

In S35, the controller 9 detects an output amplitude of the XI lane by using the amplitude detector 6. That is, the output amplitude of the amplifier 5XI is detected. Similarly, in S36-S38, the controller 9 detects output amplitudes of the XQ lane, the YI lane and the YQ lane.

In S39, the controller 9 calculates an input optical power of the XI component of the target wavelength based on the gain control voltage of the amplifier 5XI detected in S31, the output amplitude of the amplifier 5XI detected in S35 and the dependence information for the XI component stored in the memory 10. For example, the controller 9 decides whether the output amplitude of the amplifier 5XI is the same as the target amplitude. In this description, "same" is not limited to completely the same but includes a situation in which an error is sufficiently small. When the output amplitude of the amplifier 5XI is not the same as the target amplitude, the controller 9 waits until the output amplitude of the amplifier 5XI is controlled to be the target amplitude. When the output amplitude of the amplifier 5XI is the same as the target amplitude, the controller 9 calculates an input optical power corresponding to the gain control voltage of the amplifier 5XI based on the dependence information stored in the memory 10. For example, the input optical power of the XI component of the target wavelength is calculated by giving the gain control voltage of the amplifier 5XI to the dependence formula. Similarly, in S40-42, the controller 9 calculates input optical powers of the XQ component, the YI component and the YQ component of the target wavelength.

In S43, the controller 9 calculates a total sum of the input optical power of the XI component obtained in S39, the input optical power of the XQ component obtained in S40, the input optical power of the YI component obtained in S41 and the input optical power of the YQ component obtained in S42. As a result, the input optical power of the target wavelength is calculated.

In S44-45, the controller 9 corrects the input optical power value calculated in S43. In S44, the controller 9 corrects the input optical power value based on the target wavelength. At this time, the input optical power value is corrected based on a difference between the target wavelength and the reference wavelength. In S45, the controller 9 corrects the input optical power value based on the temperature around the amplifiers 5XI, 5XQ, 5YI and 5YQ. At this time, the input optical power value is corrected based on a difference between the temperature detected by the temperature sensor 11 and a specified reference temperature.

In S46, the controller 9 adjusts an attenuation amount of the variable optical attenuator 1 based on the input optical power calculated in S31-S45. At this time, the controller 9 adjusts the attenuation amount of the variable optical attenuator 1 in a method illustrated in FIG. 7. As a result, the input optical power of the target wavelength (that is, an optical power of a target wavelength in a WDM optical signal output from the variable optical attenuator 1) is controlled to be a specified target value.

As described above, according to the first embodiment, an input optical power of a target wavelength can be calculated without using an optical filter to extract an optical signal of the target wavelength from a WDM optical signal. The input optical power is calculated based on dependence information that indicates a dependence relation between an input optical power of an optical signal of a single wavelength and a configuration of the coherent optical receiver. Thus, the input optical power of a target wavelength can be precisely calculated. In addition, the calculated input optical power value is corrected based on a difference between the target wavelength and a reference wavelength and a difference between a temperature around the amplifier 5 and a reference temperature. Then an attenuation amount of the variable optical attenuator 1 is adjusted based on the precisely calculated or corrected input optical power. Thus, the input optical power of the target wavelength can be precisely maintained at a target level. As a result, an optical signal of the target wavelength can be converted into an electric signal having a high sensitivity by the photo detector 4, and transmission data can be precisely recovered by a demodulation circuit.

Second Embodiment

In the first embodiment, the variable optical attenuator that adjusts a power of an input optical signal is automatically controlled by the controller. In the second embodiment, the variable optical attenuator that adjusts a power of an input optical signal is controlled from outside of the coherent optical receiver. For example, an amount of the variable optical attenuator is manually adjusted by a user or a network administrator.

Figure 11:
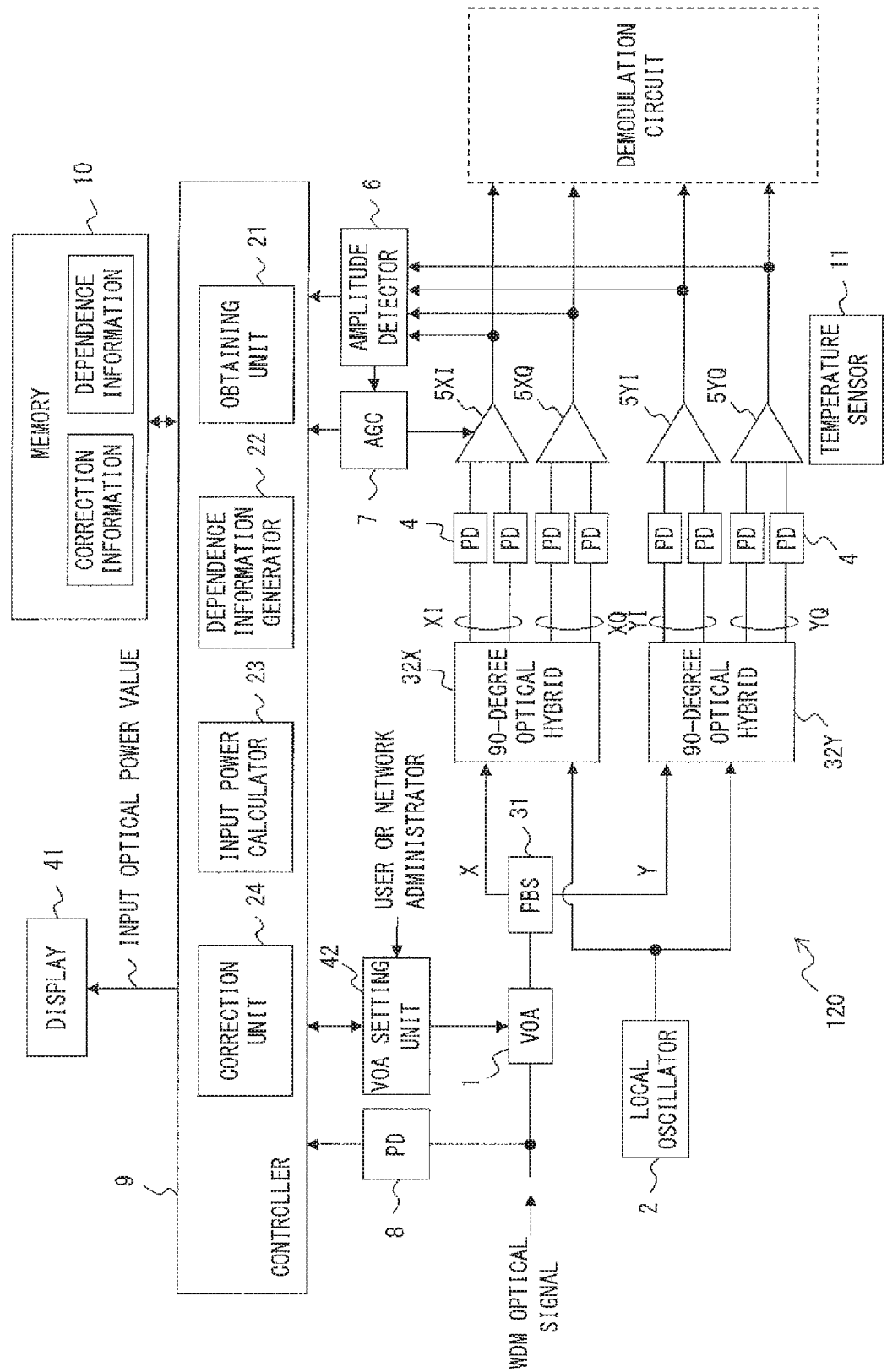
FIG. 11 illustrates an example of a coherent optical receiver according to a second embodiment.

FIG. 11 illustrates an example of a coherent optical receiver according to the second embodiment. Note that the variable optical attenuator 1, the local oscillator 2, the polarization beam splitter 31, the 90-degree optical hybrid circuits 32X and 32Y, the photo detector 4, the amplifiers 5XI, 5XQ, 5YI, 5YQ, the amplitude detector 6, the gain controller 7, the photo detector 8, the memory 10, and the temperature sensor 11 may be substantially the same in the first embodiment and the second embodiment.

A coherent optical receiver 120 according to the second embodiment includes, as illustrated in FIG. 11, a display unit 41 and a VOA setting unit 42. Note that the controller 9 does not necessarily include the VOA controller 28 illustrated in FIG. 8.

The display unit 41 displays an input optical power value of a target wavelength calculated by the controller 9. Note that the controller 9 displays a power value of an optical signal input into the variable optical attenuator 1 (not a power of an optical signal output from the variable optical attenuator 1) on the display unit 41.

The VOA setting unit 42 adjusts an attenuation amount of the variable optical attenuator 1 according to an instruction from a user or a network administrator. It is assumed that the controller 9 can obtain information indicating the attenuation amount of the variable optical attenuator 1 from the VOA setting unit 42.

Figure 12:
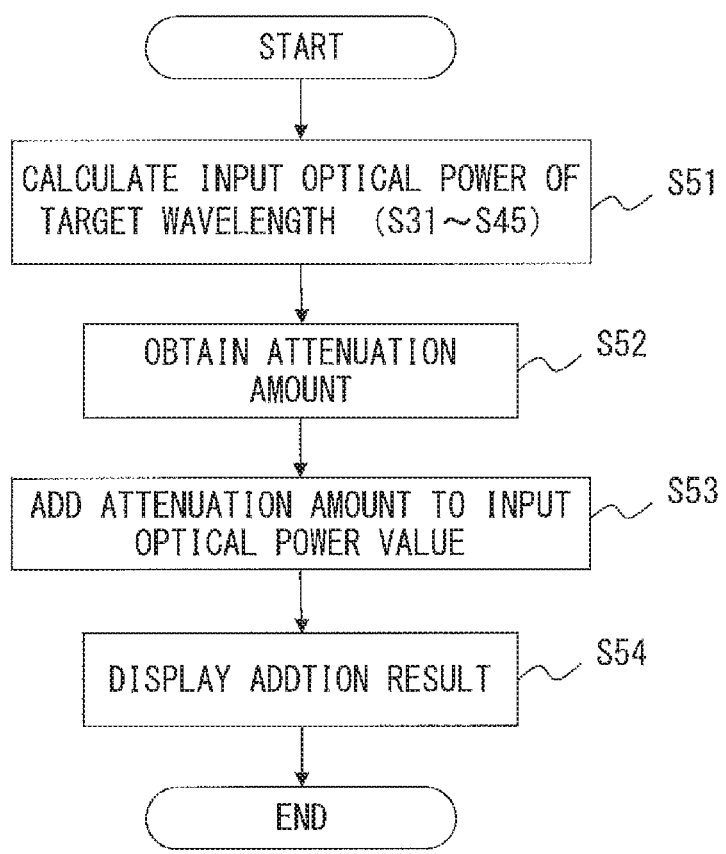
FIG. 12 is a flowchart that illustrates an example of operations of the coherent optical receiver according to the second embodiment.

FIG. 12 is a flowchart that illustrates an example of operations of the coherent optical receiver according to the second embodiment. The process of S51 corresponds to the processes of S31-S45 illustrated in FIG. 10. Here, the input optical power value calculated in S51 indicates a power of an optical signal of a target wavelength output from the variable optical attenuator 1.

In S52, the controller 9 obtains information indicating an attenuation amount of the variable optical attenuator 1 from the VOA setting unit 42. In S53, the controller 9 adds the attenuation amount obtained in S52 to the input optical power value calculated in S51. As a result, a power of the optical signal of the target wavelength input into the coherent optical receiver 120 is calculated. Then in S54, the controller 9 displays the input optical power value calculated in S53 on the display unit 41.

As described above, in the second embodiment, a power of an optical signal of a target wavelength input into the coherent optical receiver 120 (not a power of an optical signal of a target wavelength attenuated by the variable optical attenuator 1) is displayed on the display unit 41. Thus, a user or a network administrator of the coherent optical receiver 120 can recognize an input optical power before being attenuated by the variable optical attenuator 1. Accordingly, the user or the network administrator can easily optimize a received power at the photo detector 4 in a coherent optical receiver in which the variable optical attenuator 1 is adjusted via manual operation by the user or the network administrator.

Other Embodiments

Figure 13:
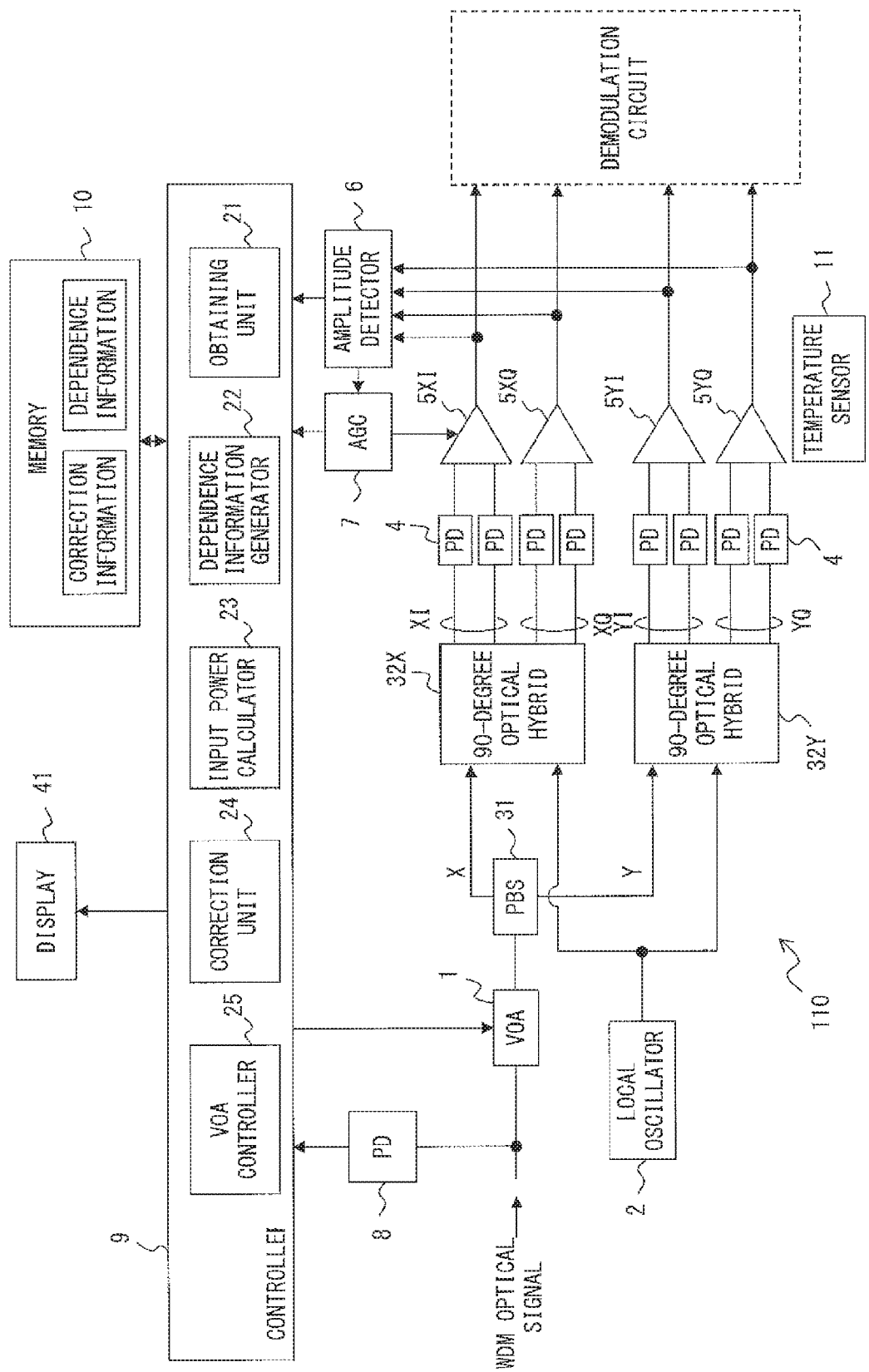
FIG. 13 illustrates a configuration a coherent optical receiver according to another embodiment.

In the first embodiment, the variable optical attenuator 1 is automatically adjusted. In the second embodiment, an input optical power value is displayed on the display unit 41 in a configuration in which the variable optical attenuator 1 is adjusted via manual operation. However, the invention is not limited to these configurations. For example, as illustrated in FIG. 13, an input optical power value may be displayed on the display unit 41 in a configuration in which the variable optical attenuator 1 is automatically adjusted. In this case, a power of an optical signal of a target wavelength input into the coherent optical receiver 120 may be displayed on the display unit 41. In addition, a power of an optical signal of a target wavelength output from the variable optical attenuator 1 may be displayed on the display unit 41.

Note that a coherent optical receiver described below is one of the aspects of the invention.

A coherent optical receiver comprising:
a local oscillator that generates local oscillator light of a target wavelength;
a mixer that mixes an optical signal output from the variable optical attenuator and the local oscillator light;
a photo detector that converts an optical signal output from the mixer into an electric signal;
an amplifier that amplifies an output signal of the photo detector;
a gain controller that controls a gain of the amplifier;
a detector that detects an amplitude of an output signal of the amplifier;
a memory that stores dependence information that indicates a relation between an input optical power of an optical signal of a specified wavelength and a gain of the amplifier, the dependence information being obtained when an optical signal of the specified wavelength is input into the coherent optical receiver and an amplitude of the output signal of the amplifier is controlled to be a specified target amplitude; and a calculator that calculates an input optical power of the target wavelength based on an amplitude of the output signal of the amplifier, a gain of the amplifier, and the dependence information, when a wavelength division multiplexed optical signal is input into the coherent optical receiver.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A coherent optical receiver comprising:
   a variable optical attenuator that adjusts a power of an input optical signal;
   a local oscillator that generates local oscillator light of a target wavelength;
   a mixer that mixes an optical signal output from the variable optical attenuator and the local oscillator light;
   a photo detector that converts an optical signal output from the mixer into an electric signal;
   an amplifier that amplifies an output signal of the photo detector;
   a gain controller that controls a gain of the amplifier;
   a detector that detects an amplitude of an output signal of the amplifier;
   a memory that stores dependence information that indicates a relation between an input optical power of an optical signal of a specified wavelength and a gain of the amplifier, the dependence information being obtained when an optical signal of the specified wavelength is input into the coherent optical receiver and an amplitude of the output signal of the amplifier is controlled to be a specified target amplitude; and
   a controller that calculates an input optical power of the target wavelength based on an amplitude of the output signal of the amplifier, a gain of the amplifier, and the dependence information, and controls an attenuation amount of the variable optical attenuator based on the calculated input optical power, when a wavelength division multiplexed optical signal is input into the coherent optical receiver.

2. The coherent optical receiver according to claim 1, wherein
   the gain controller controls the gain of the amplifier such that the amplitude of the output signal of the amplifier approaches the target amplitude,
   the controller calculates the input optical power corresponding to the gain of the amplifier based on the dependence information when the amplitude of the output signal of the amplifier is the same or approximately the same as the target amplitude.

3. The coherent optical receiver according to claim 1, wherein
   the controller includes a correction unit that corrects the input optical power, that is calculated based on the amplitude of the output signal of the amplifier, the gain of the amplifier, and the dependence information, based on the target wavelength,
   the controller controls the attenuation amount of the variable optical attenuator based on the input optical power corrected by the correction unit.

4. The coherent optical receiver according to claim 1, wherein
   the controller includes a correction unit that corrects the input optical power, that is calculated based on the amplitude of the output signal of the amplifier, the gain of the amplifier, and the dependence information, based on the temperature around the amplifier,
   the controller controls the attenuation amount of the variable optical attenuator based on the input optical power corrected by the correction unit.

5. A coherent optical receiver comprising:
   a variable optical attenuator that adjusts a power of an input optical signal;
   a polarization beam splitter that generates a first polarization component and a second polarization component that are orthogonal to each other from an optical signal output from the variable optical attenuator;
   a local oscillator that generates local oscillator light of a target wavelength;
   a 90-degree optical hybrid circuit that mixes the first polarization component and the local oscillator light to generate a first optical signal and a second optical signal and mixes the second polarization component and the local oscillator light to generate a third optical signal and a fourth optical signal, a phase of the second optical signal being shifted by 90 degrees from a phase of the first optical signal, and a phase of the fourth optical signal being shifted by 90 degrees from a phase of the third optical signal;
   a photo detector circuit that respectively converts the first through fourth optical signals into first through fourth electric signals;
   first through fourth amplifiers that respectively amplify first through fourth electric signals;
   again controller that controls gains of the first through fourth amplifiers;
   a detector that detects amplitudes of output signals of the first through fourth amplifiers;
   a memory that stores, for each of the first through fourth amplifiers, dependence information that indicates a relation between an input optical power of an optical signal of a specified wavelength and a gain of a corresponding amplifier, the dependence information being obtained when an optical signal of the specified wavelength is input into the coherent optical receiver and an amplitude of the output signal of the corresponding amplifier is controlled to be a specified target amplitude; and
   a controller that calculates a first input optical power based on an amplitude of the output signal of the first amplifier, a gain of the first amplifier, and the dependence information corresponding to the first amplifier, calculates a second input optical power based on an amplitude of the output signal of the second amplifier, a gain of the second amplifier, and the dependence information corresponding to the second amplifier, calculates a third input optical power based on an amplitude of the output signal of the third amplifier, a gain of the third amplifier, and the dependence information corresponding to the third amplifier, calculates a fourth input optical power based on an amplitude of the output signal of the fourth amplifier, a gain of the fourth amplifier, and the dependence information corresponding to the fourth amplifier, calculates an input optical power of the target wavelength based on the first through fourth input optical power, and controls an attenuation amount of the variable optical attenuator based on the calculated input optical power, when a wavelength division multiplexed optical signal is input into the coherent optical receiver.

* * * * *